US010079892B2

(12) United States Patent
Dinh-Trong et al.

(10) Patent No.: US 10,079,892 B2
(45) Date of Patent: Sep. 18, 2018

(54) SYSTEM AND METHOD FOR SUGGESTING AUTOMATED ASSISTANTS BASED ON A SIMILARITY VECTOR IN A GRAPHICAL USER INTERFACE FOR MANAGING COMMUNICATION SESSIONS

(75) Inventors: Trung Dinh-Trong, Bedminster, NJ (US); Birgit Geppert, Basking Ridge, NJ (US); Frank Roessler, Basking Ridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 634 days.

(21) Appl. No.: 12/978,926

(22) Filed: Dec. 27, 2010

(65) Prior Publication Data

US 2011/0258544 A1   Oct. 20, 2011

Related U.S. Application Data

(60) Provisional application No. 61/325,103, filed on Apr. 16, 2010.

(51) Int. Cl.
*H04L 29/08* (2006.01)
*G06Q 50/00* (2012.01)
(Continued)

(52) U.S. Cl.
CPC ........ *H04L 67/14* (2013.01); *G06F 17/30873* (2013.01); *G06Q 30/02* (2013.01);
(Continued)

(58) Field of Classification Search
CPC ............................... G06Q 50/01; H04L 51/32
(Continued)

(56) References Cited

U.S. PATENT DOCUMENTS

| 5,727,950 A * | 3/1998 | Cook ..................... G09B 5/02 434/350 |
| 6,427,063 B1 * | 7/2002 | Cook ..................... G09B 7/00 434/118 |

(Continued)

FOREIGN PATENT DOCUMENTS

| CN | 101783920 | 7/2010 |
| EP | 237533 | 10/2010 |

(Continued)

OTHER PUBLICATIONS

Bing search q=automated+assistant+past+session&s Apr. 29, 2016.*

(Continued)

*Primary Examiner* — Jeffrey A Gaffin
*Assistant Examiner* — John M Heffington
(74) *Attorney, Agent, or Firm* — Sheridan Ross P.C.

(57) ABSTRACT

Disclosed herein are systems, methods, and non-transitory computer-readable storage media for suggesting and inserting automated assistants in a graphical user interface for managing communication sessions. A system for suggesting an automated assistant generates a first vector describing a current context of a current communication session, and generates a comparison of the first vector and a second vector associated with a past context of an automated assistant in a past communication session. Then, if the comparison exceeds a similarity threshold, the system suggests the automated assistant to at least one user in the current communication session. Optionally, the system can predictively insert the automated assistant in a communication session if the comparison exceeds a similarity threshold. The graphical user interface for managing communication sessions displays automated assistants in a same manner as human participants.

20 Claims, 5 Drawing Sheets

(51) Int. Cl.
*G06F 17/30* (2006.01)
*H04L 12/58* (2006.01)
*G06Q 30/02* (2012.01)

(52) U.S. Cl.
CPC .............. *G06Q 50/01* (2013.01); *H04L 51/32* (2013.01); *H04L 67/22* (2013.01)

(58) Field of Classification Search
USPC .................................. 715/708, 733, 749, 765
See application file for complete search history.

(56) References Cited

U.S. PATENT DOCUMENTS

| | | | | |
|---|---|---|---|---|
| 6,466,654 | B1* | 10/2002 | Cooper | G10L 15/26 379/88.01 |
| 6,657,643 | B1* | 12/2003 | Horvitz | G06Q 10/109 715/709 |
| 6,711,543 | B2 | 3/2004 | Cameron | 704/270 |
| 6,973,478 | B1* | 12/2005 | Ketonen | G06Q 30/02 709/202 |
| 7,023,979 | B1* | 4/2006 | Wu et al. | 379/265.11 |
| 7,469,240 | B2* | 12/2008 | Tsukamoto | G06F 17/30707 706/48 |
| 7,613,659 | B1* | 11/2009 | Hoffman | C07K 14/53 705/14.26 |
| 7,614,014 | B2* | 11/2009 | Burgin | G06Q 30/02 715/764 |
| 7,627,536 | B2* | 12/2009 | Kacmarcik | 706/11 |
| 7,676,034 | B1* | 3/2010 | Wu et al. | 379/265.01 |
| 7,885,902 | B1* | 2/2011 | Shoemaker et al. | 705/319 |
| 8,041,765 | B1* | 10/2011 | Krishnaswamy | G06Q 10/107 709/204 |
| 8,060,386 | B2* | 11/2011 | Stevenson | G06N 3/006 705/35 |
| 8,085,693 | B2* | 12/2011 | Ristock | 370/270 |
| 8,096,809 | B2* | 1/2012 | Burgin | G06F 17/30873 434/118 |
| 8,434,004 | B2* | 4/2013 | Hartman | A63F 13/12 715/706 |
| 8,463,854 | B2* | 6/2013 | Karkanias | 709/204 |
| 8,495,496 | B2* | 7/2013 | Bastide et al. | 715/730 |
| 8,499,243 | B2* | 7/2013 | Yuki | 715/735 |
| 8,522,168 | B2* | 8/2013 | Williams | 715/854 |
| 8,621,393 | B2* | 12/2013 | Chaudhri et al. | 715/835 |
| 8,640,034 | B2* | 1/2014 | Bergman et al. | 715/740 |
| 8,683,086 | B2* | 3/2014 | Reeves et al. | 710/8 |
| 8,707,192 | B2* | 4/2014 | Robert et al. | 715/767 |
| 8,732,600 | B2* | 5/2014 | Robert et al. | 715/767 |
| 8,788,295 | B1* | 7/2014 | Wargin et al. | 705/4 |
| 8,839,112 | B2* | 9/2014 | Neerudu et al. | 715/733 |
| 8,843,851 | B1* | 9/2014 | Gotchy et al. | 715/819 |
| 2002/0028683 | A1* | 3/2002 | Banatre | H04W 4/24 455/456.3 |
| 2002/0091832 | A1* | 7/2002 | Low et al. | 709/227 |
| 2002/0146668 | A1* | 10/2002 | Burgin | G06F 17/30873 434/118 |
| 2003/0046689 | A1* | 3/2003 | Gaos | G06Q 30/02 725/34 |
| 2003/0053615 | A1* | 3/2003 | Anderson | G06Q 30/02 379/265.09 |
| 2003/0212648 | A1* | 11/2003 | Cunningham | G06F 17/2247 |
| 2005/0111653 | A1* | 5/2005 | Joyce | H04M 3/523 379/265.09 |
| 2005/0114524 | A1* | 5/2005 | Tiruthani | 709/228 |
| 2005/0129250 | A1* | 6/2005 | Aubauer | H04M 1/6066 381/17 |
| 2005/0144162 | A1* | 6/2005 | Liang | G06F 17/30109 |
| 2005/0170323 | A1* | 8/2005 | Jarrell | G09B 23/28 434/262 |
| 2005/0238046 | A1* | 10/2005 | Hassan | H04L 12/5692 370/465 |
| 2006/0074831 | A1* | 4/2006 | Hyder | G06N 5/02 706/45 |
| 2006/0287878 | A1* | 12/2006 | Wadhwa et al. | 705/1 |
| 2006/0294099 | A1* | 12/2006 | Tsukamoto | G06F 17/30707 |
| 2007/0011270 | A1* | 1/2007 | Klein | H04L 67/306 709/217 |
| 2007/0036334 | A1 | 2/2007 | Culbertson et al. | |
| 2007/0038619 | A1* | 2/2007 | Norton | G06F 17/3064 |
| 2007/0142002 | A1* | 6/2007 | Rofougaran | H04W 72/1215 455/114.2 |
| 2008/0015418 | A1* | 1/2008 | Jarrell | G06F 19/327 600/300 |
| 2008/0043986 | A1* | 2/2008 | Darby | H04M 3/5322 379/265.09 |
| 2008/0103936 | A1* | 5/2008 | Churlik | G06Q 30/02 705/26.41 |
| 2008/0221892 | A1* | 9/2008 | Nathan | G06F 17/279 704/257 |
| 2009/0003558 | A1 | 1/2009 | Katis et al. | |
| 2009/0012800 | A1* | 1/2009 | Devarakonda | G06F 8/24 705/301 |
| 2009/0030800 | A1* | 1/2009 | Grois | G06F 17/30864 705/14.52 |
| 2009/0106673 | A1* | 4/2009 | Jung | G06Q 30/06 715/757 |
| 2009/0144143 | A1* | 6/2009 | Iyer | G06Q 30/0254 705/14.52 |
| 2009/0210476 | A1* | 8/2009 | Levy | G06Q 30/02 709/201 |
| 2009/0222302 | A1* | 9/2009 | Higgins et al. | 705/7 |
| 2009/0222303 | A1* | 9/2009 | Higgins et al. | 705/7 |
| 2009/0222304 | A1* | 9/2009 | Higgins et al. | 705/7 |
| 2009/0288002 | A1* | 11/2009 | Hamilton, II | G06F 3/0481 715/706 |
| 2009/0307003 | A1* | 12/2009 | Benyamin et al. | 705/1 |
| 2010/0153497 | A1 | 6/2010 | Sylvain et al. | |
| 2010/0158236 | A1* | 6/2010 | Chang | H04M 3/5175 379/265.03 |
| 2010/0180041 | A1* | 7/2010 | Thomas | G06F 15/16 709/230 |
| 2010/0185630 | A1* | 7/2010 | Cheng et al. | 707/756 |
| 2010/0205430 | A1* | 8/2010 | Chiou et al. | 713/156 |
| 2010/0257028 | A1* | 10/2010 | Hillerbrand | 705/10 |
| 2010/0313147 | A1* | 12/2010 | Hartman | A63F 13/12 715/757 |
| 2010/0313249 | A1* | 12/2010 | Castleman | 726/5 |
| 2010/0324941 | A1* | 12/2010 | Stevenson | G06N 3/006 705/4 |
| 2011/0003579 | A1* | 1/2011 | Cai | G06Q 20/14 455/408 |
| 2011/0058662 | A1 | 3/2011 | Yoakum et al. | |
| 2011/0119143 | A1* | 5/2011 | Head | G06Q 10/06 705/26.1 |
| 2011/0125850 | A1* | 5/2011 | Rahnama et al. | 709/205 |
| 2011/0141919 | A1* | 6/2011 | Singh | H04L 41/0681 370/252 |
| 2012/0039459 | A1* | 2/2012 | Mergen et al. | 379/265.01 |
| 2014/0026057 | A1* | 1/2014 | Kimpton et al. | 715/733 |
| 2014/0143695 | A1* | 5/2014 | Sundermeyer et al. | 715/765 |
| 2014/0189506 | A1* | 7/2014 | Birnbaum et al. | 715/702 |
| 2014/0223300 | A1* | 8/2014 | Li et al. | 715/708 |
| 2014/0245141 | A1* | 8/2014 | Yeh et al. | 715/708 |
| 2014/0245142 | A1* | 8/2014 | Dresti et al. | 715/708 |

FOREIGN PATENT DOCUMENTS

| | | |
|---|---|---|
| JP | 2000-050226 | 2/2000 |
| JP | 2002-281468 | 9/2002 |
| JP | 2009-086871 | 4/2009 |

OTHER PUBLICATIONS

Bing search q=digital%20past%20session&qs=n&form Apr. 29, 2016.*

Pena-Mora F. [et al.]: CAIRO: a concurrent engineering meeting environment for virtual design teams. Artificial Intelligence in Engineering 14, 2000, p. 203-219. URL: http://citeseerx.ist.psu.edu/viewdoc/versions;jsessionId=

(56) References Cited

OTHER PUBLICATIONS

80A64744F7194DCBF433311A844602A3?doi=10.1.1.93.326 [retrieved on Oct. 9, 2012].
Hanssens, N. [et al.]: Building Agent-Based Intelligent Workspaces. ABA Conference Proceedings, 2002, URL: http://citeseerx.ist.psu.edu/viewdoc/summary?doi=10.1.1.13.6302 [retrieved on Oct. 9, 2012].

* cited by examiner

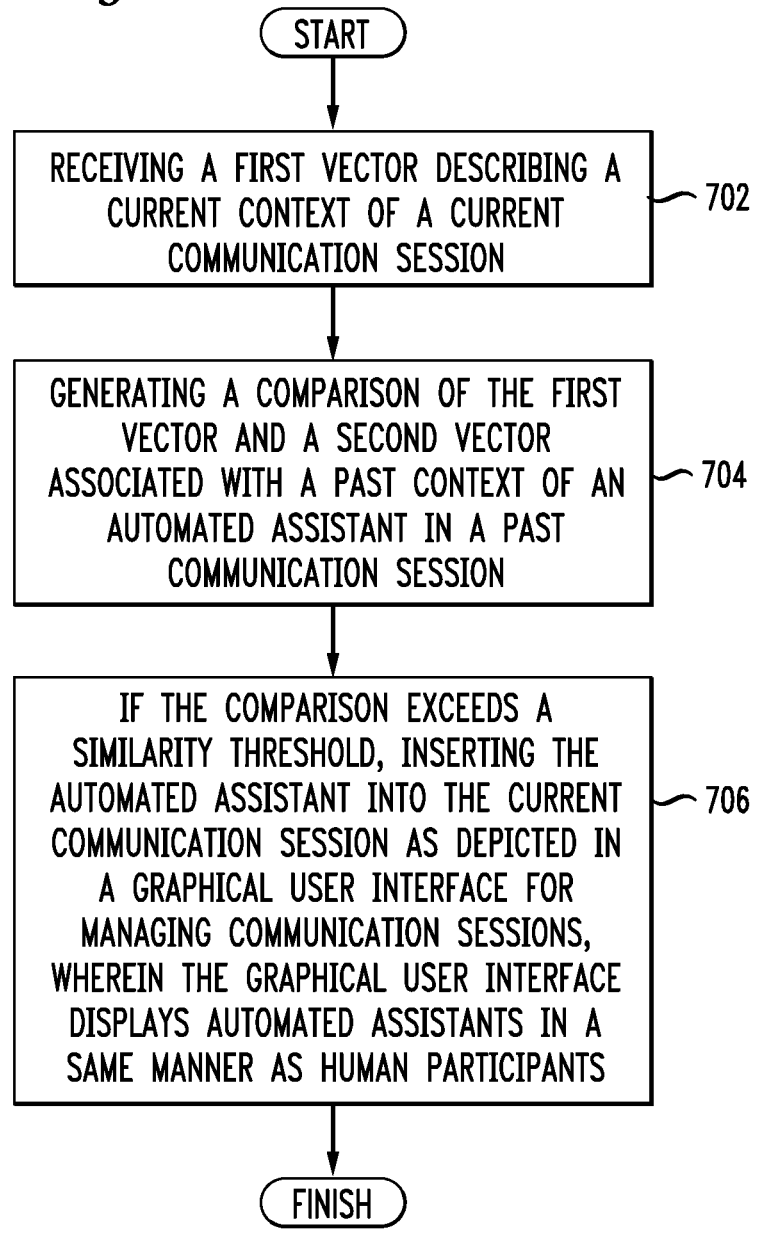

SYSTEM AND METHOD FOR SUGGESTING AUTOMATED ASSISTANTS BASED ON A SIMILARITY VECTOR IN A GRAPHICAL USER INTERFACE FOR MANAGING COMMUNICATION SESSIONS

RELATED APPLICATIONS

This application claims priority to U.S. Provisional Application 61/325,103, filed 16 Apr. 2010, the contents of which are herein incorporated by reference in their entirety.

BACKGROUND

1. Technical Field

The present disclosure relates to communications and more specifically to suggesting or inserting an automated assistant in a graphical representation of a communication session based on similarity to a previous use context of the automated assistant.

2. Introduction

As graphical user interfaces for managing communication sessions in a call connection graph metaphor become more sophisticated, user can create, download, and accumulate more automated assistants, or robots, for use in the call connection graph. However, as the numbers and types of automated assistants grow, users may encounter difficulty in organizing automated assistants, remembering which automated assistants are available, remembering their names, specific functionality, how to quickly locate the appropriate automated assistant, and so forth. While automated assistants have the potential to very efficiently simplify many common communication tasks, users need additional help in finding the right robot for the right context at the right time.

Some approaches to similar problems in other fields have by provided a searchable alphabetical list or categorized list of items or a set of favorites/bookmarks. However, these approaches still require a user to know what to search for or under which category a particular automated assistant would fall. Further, a search requires the user to take additional steps which can distract the user's focus from a current communication session at a critical time when the user may already be heavily multitasking.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for suggesting automated assistants in a graphical user interface for managing communication sessions that displays automated assistants in a same manner as human participants. A system configured to practice the method generates a first vector describing a current context of a current communication session. Then the system generates a comparison of the first vector and a second vector associated with a past context of an automated assistant in a past communication session. If the comparison exceeds a similarity threshold, the system suggests the automated assistant to at least one user in the current communication session. The first vector and the second vector can be of different dimensionalities. In this case, the system can convert the first vector to a same dimensionality as the second vector. Each dimension of the first and second vectors can describe a single attribute of a respective communication session. The system can also receive a similarity constraint, and generate the comparison of the first vector and the second vector based on the similarity constraint. The constraint can be a set of users, a set of automated assistants, timing, communication session content, and/or communication session metadata. The system can further insert the automated assistant in the current communication session and optionally update the second vector based on interactions with the automated assistant in the current communication session.

In another example, the system predictively inserts automated assistants in a communication session. The system receives a first vector describing a current context of a current communication session and generates a comparison of the first vector and a second vector associated with a past context of an automated assistant in a past communication session. If the comparison exceeds a similarity threshold, the system inserts the automated assistant into the current communication session as depicted in a graphical user interface for managing communication sessions, wherein the graphical user interface displays automated assistants in a same manner as human participants.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 7 illustrates a second example method embodiment for predictively inserting an automated assistant.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for more easily managing and using automated assistants in a graphical user interface representation of a call connection graph in which the automated assistants are displayed in the same manner as human participants. A brief introductory description of a basic general purpose system or computing device in FIG. 1 which can be employed to practice the concepts is disclosed herein. A more detailed description of the disclosure as related to suggesting and predicting automated assistants will then follow. These variations shall be discussed herein as the various embodiments are set forth. The disclosure now turns to FIG. 1.

Figure 1:
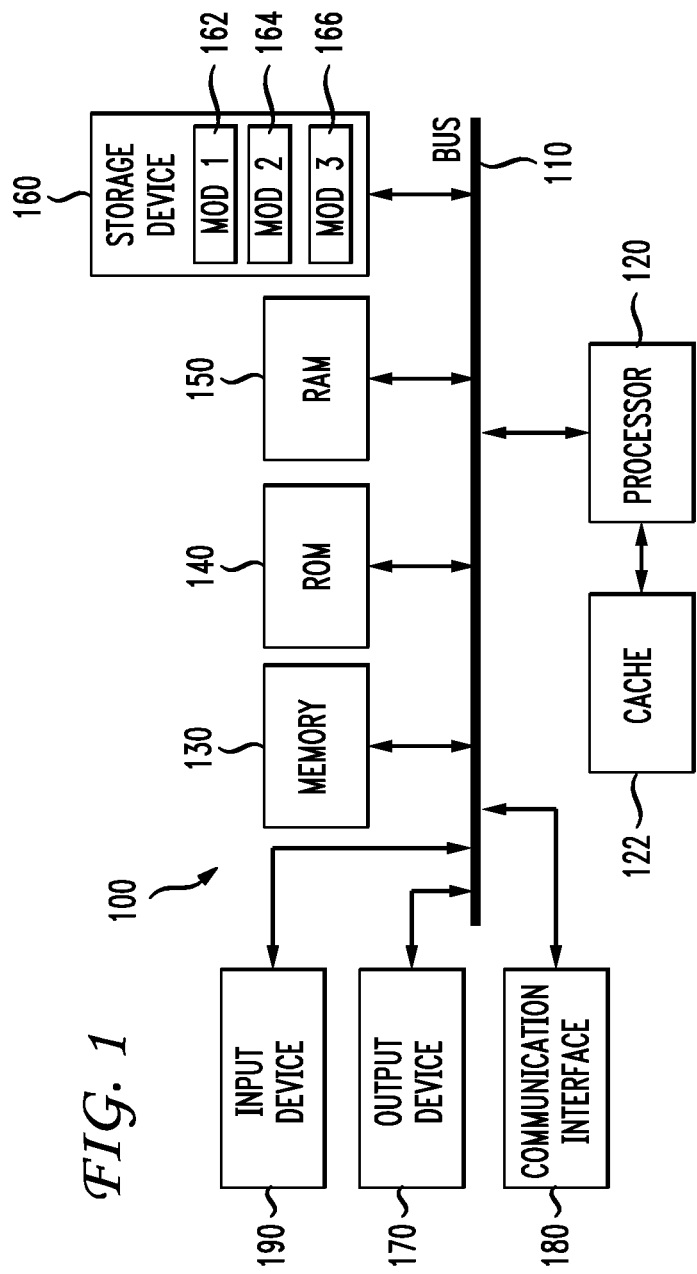
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, and the like, may also be used in the exemplary operating environment. Computer-readable storage media and devices expressly exclude transitory media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having disclosed some components of a computing system, the disclosure now returns to a discussion of how to suggest automated assistants predictively and/or how to insert automated assistants automatically based on one or more similarity vector and/or a temporal connection. Further, a user can view, restrict, and sort a list of suggested robots based on a similarity vector, and/or by criteria. In the context of robots, this approach can, for example, place icons contextually, contextually correlate materials, contextually launch applications. A user can cull the vector/connection/time stamp, or sequence them according to one or more criteria.

The similarity vector can be based on a "use context" describing where the robot was invoked, which user (or users) invoked the robot, time, date, type of data manipulated, other users and/or robots associated with the robot, recency of use, and so forth. Each of these pieces of the "use context" can be part of a context similarity vector. The system can base predictive suggestions on the similarity vector. A user can filter each element of the similarity vector individually to refine which types of suggestions the system provides. Further, the user can order a list of suggested robots according to one or more elements of the similarity vector.

As a brief example, if Bob speaks on the phone with a supplier on the first Wednesday of every month at 1:00 μm, the system can learn that context and, based on the similarity of the learned context to a current content, the system can trigger the suggestion of a set of robots that were either used in that specific context previously and/or a set of robots which the system extrapolates might be useful for Bob based on a comparison with similar contexts. Further, the context can be tied to a specific time, day, month, person, set of communication session participants, communication mode, telephone number, device, location, how recently the robot was used, communication content, and so forth. The context can be based on information associated with one or more party to the communication session.

As another example, consider a businessman receiving a telephone call during business hours. Part of the context is "during business hours" which would be very different from a vector generated by an incoming call on a Sunday or at 10:30 pm on a weekday. The system suggests a list of automated assistants recently used during business hours, such as a conference call robot, a scheduling robot, etc. The system can present a list of automated assistants in a popup menu from which the user can activate one or more automated assistants. Alternatively, the system can decide which action to take based on how similar the automated assistant's vector is to a current context vector. For instance, if the vectors are more than a 95% match, then the system can automatically insert the automated assistant without prompting the user. If the vectors are between a 70% and 95% match, then the system can display the automated assistant for 5 seconds and if the user does not dismiss the automated assistant after 5 seconds, the automated assistant remains. If the vectors are between a 60% and 70% match, then the system can display the automated assistant to the user for confirmation before adding the automated assistant to the communication session. If the vectors are less than a 60% match, then the system does not even present the automated assistant to the user at all.

In another variation, the GUI includes a list or robots (somewhat like a list of contacts), and the system changes the color, size, or other feature of the icons of predicted robots based on their expected similarity to the current context. The predicted robots in the list of robots can blink, shake, bubble to the top of the list, float out of the list into the main communication session area, etc. In another embodiment, icons representing the predictive robots appear to be calling in to the communication session. The user can then simply accept the incoming call for the predictive robots he or she wishes to use and hang up on or ignore incoming calls for those he or she does not wish to use. The system can display additional information for the user to drill down into why the system has indicated that a particular automated assistant is similar to a current context. If the system has identified a close similarity based on an attribute that the user does not consider relevant, the user can instruct the system to ignore that attribute temporarily or permanently.

When the user manually or automatically triggers a robot, the system can record a context vector for that robot. The context vector can store multiple pieces of information describing the context at that time, as set forth above. The system can store multiple context vectors for each robot indicating which contexts the robot was used. In one aspect, the system keeps each generated context vector, but if limited storage is available, the system can cull the context vectors by removing vectors older than a certain period of time (such as 3 months), by only keeping a certain number of vectors (such as the last 20 vectors), or by discarding vectors which are the same or which exceed a similarity threshold. In another aspect, the context vector 'ages', meaning that older context vectors are worth less than newer context vectors.

The system can maintain a current context vector and compare the current context vector with at least some of the stored context vectors. In one optimization, the system does not compare the current context vector to vectors of currently running automated assistants because if an automated assistant is currently running the system has little need to suggest it to the user. Based on the comparison and a similarity threshold, the system determines a predictive list of robots to present to the user. The list can be one or more robots. The list can include an indication of the reason a particular robot on the list was selected (i.e. this robot was selected because it was previously used with the same person and at the same general time of day as the current context). The system can select the top N predictive robots or can select all the robots having contexts above the similarity threshold.

As another concrete example, suppose the context is a call from a supervisor during business hours. The system can examine call context vectors of various robots to suggest a list of robots recently used with that supervisor (or with any of a group of supervisors), such as a recording or transcription robot. This approach can save time for users and allow them to quickly access relevant robots for a given communication context.

The vectors disclosed herein can include an importance or a weight for each dimension of the vector or attribute the vector describes. In one aspect, each user in a communication session (such as a conference call) has a separate system, and each separate system generates a different vector for a current context from the point of view of that user.

Figure 2:
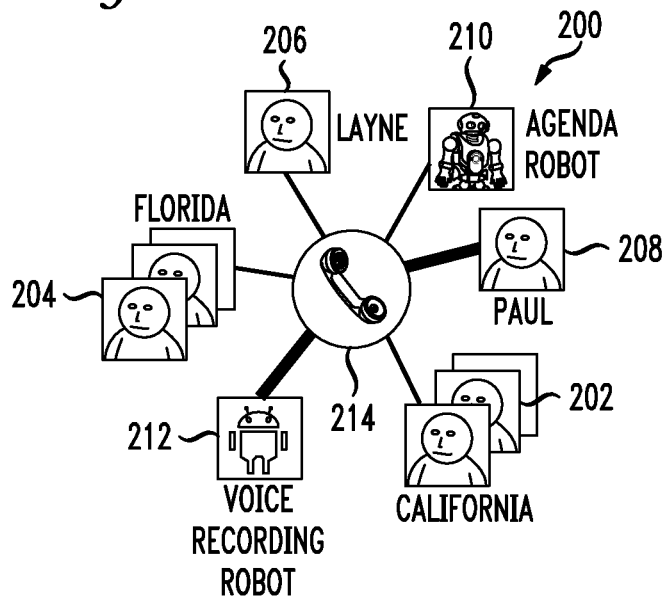
FIG. 2 illustrates a first exemplary user interface for a first communication session.

FIG. 2 illustrates a first exemplary user interface for a first communication session. The user interface 200 represents a communication session between a first group of human participants in California 202, a second group of human participants in Florida 204, Layne 206, and Paul 208. Two "robots", or automated assistants, are part of the communication session as well: an agenda robot 210 and a voice recording robot 212. The communication session is a telephone conference, as denoted by the telephone icon in the hub 214 of the user interface 200. While this exemplary user interface 200 is based on a hub, the same principles also apply to other user interface approaches for displaying a communication graph, such as a spotlight-based approach, for example. The graphical user interface can provide a user with a way to manage multiple communication sessions in a single interface. Automated assistants and human participants are displayed in the same manner in this user interface. That is, if human participants are shown as a set of connected icons, then automated assistants are also displayed as an icon in the set of connected icons, or if human participants are shown as icons under a spotlight, then automated assistants are displayed in the same way. Similarly, the user interface allows users to interact with other users in the same way as with automated assistants. While the exemplary user interfaces disclosed herein are based on a spoke representation of a call connection graph, the actual graphical user interface can be of any type, including a spotlight-based interface or a list-based interface.

The system 100 tracks the usage context for each of the automated assistants 210, 212 as a vector. The usage context can include the collection of users, the timing of the communication session, the identity of the conference moderator, the communication session modality, an agenda, documents, and other metadata describing the communication session and/or participants in the communication session. In one aspect, each automated assistant tracks its own context and reports that context to the system. In another aspect, a user's communication device can track the context for an automated assistant, from the context point of view of that user.

Figure 3:
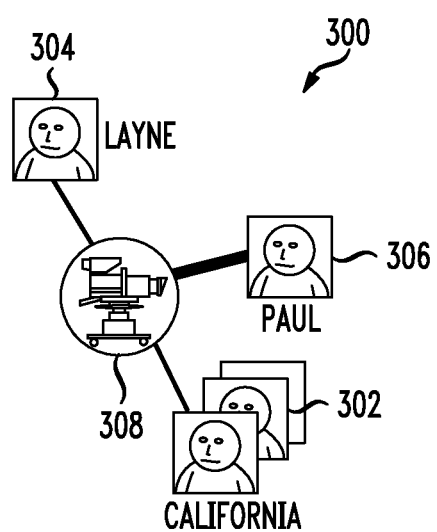
FIG. 3 illustrates a second exemplary user interface for a second communication session.

FIG. 3 illustrates a second exemplary user interface for a second communication session. The user interface 300 represents a communication session between a first group of human participants in California 302, Layne 304, and Paul 306. The communication session is a video conference, as denoted by the video camera icon in the hub 308 of the user interface 300. In this case, the system can examine the current context, generate a vector describing the current context, and compare that vector to a previously generated vector associated with an automated assistant or other resource, such as a vector describing the first communication session shown in FIG. 2. In this case, the system may determine that the differences are too great between the vectors to suggest or insert the automated assistants from FIG. 2. For example, the first communication session is a telephone conference and includes the group of participants from Florida 204, whereas those components are missing from the second communication session shown in FIG. 3.

Figure 4:
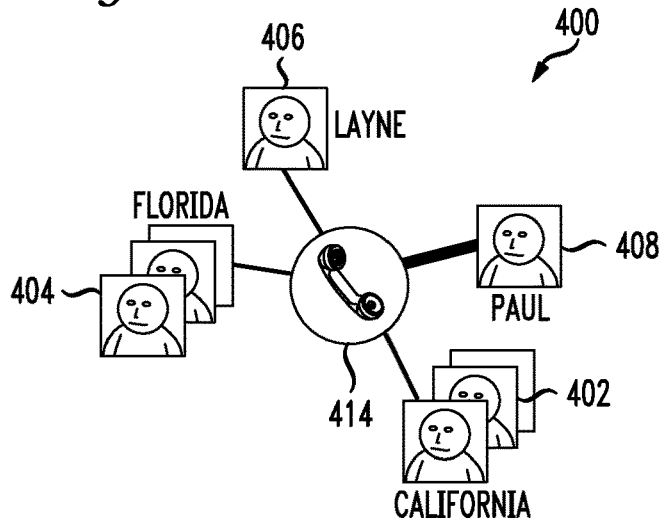
FIG. 4 illustrates a third exemplary user interface for a third communication session.

FIG. 4 illustrates a third exemplary user interface for a third communication session. The user interface 400 represents a communication session between a first group of human participants in California 402, a second group of human participants in Florida 404, Layne 406, and Paul 408. The communication session is a telephone conference, as denoted by the telephone icon in the hub 414 of the user interface 400. The system examines the current context and compares that to the context of the automated assistants used in the first communication session illustrated in FIG. 2. In this case, the contexts are a match, so the system can suggest or automatically insert the automated assistants.

Figure 5:
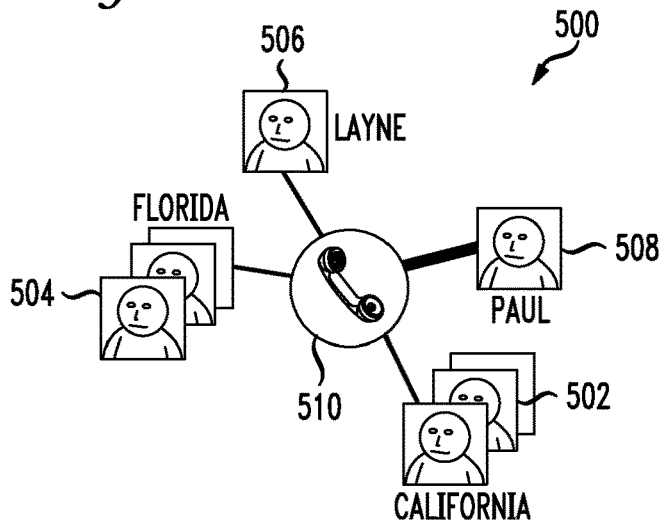
FIG. 5 illustrates an exemplary user interface for providing suggested automated assistants based on the third communication session.
Figure 5:
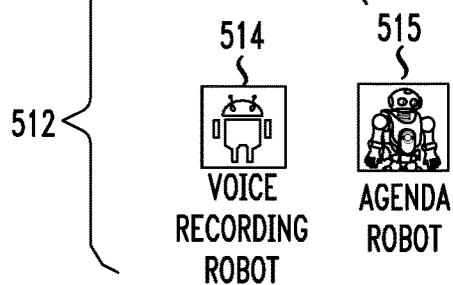

FIG. 5 illustrates an exemplary user interface for providing suggested automated assistants based on the third communication session. The user interface 500 represents a communication session between a first group of human participants in California 502, a second group of human participants in Florida 504, Layne 506, and Paul 508. The communication session is a telephone conference, as denoted by the telephone icon in the hub 514 of the user interface 500. The system provides a list 512 of suggested automated assistants, including the voice recording robot 514 and the agenda robot 516, from the first communication session based on the context similarity between the third communication session and the first communication session. The user can then click and drag the desired automated assistants into the communication session, dismiss the suggestions, drill down to determine the factors that motivated the system to make the suggestion, refine the motivating factors, and so forth.

Figure 6:
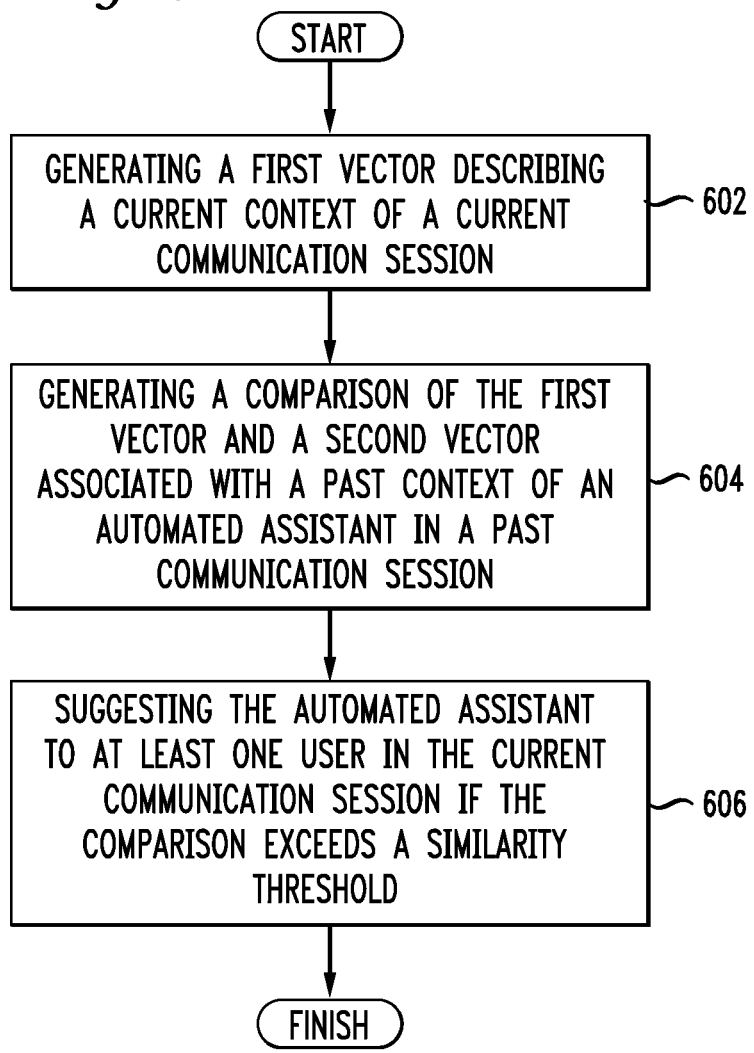
FIG. 6 illustrates a first example method embodiment for suggesting an automated assistant.

Having disclosed some basic system components and concepts, the disclosure now turns to the exemplary method embodiments shown in FIGS. 6 and 7. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps.

FIG. 6 illustrates a first example method embodiment for suggesting an automated assistant in a graphical user interface for managing communication sessions that displays automated assistants in a same manner as human participants. The system 100 generates a first vector describing a current context of a current communication session (602) and generates a comparison of the first vector and a second vector associated with a past context of an automated assistant in a past communication session (604). The first vector and the second vector can be of different dimensionalities. The system can convert, adapt, or extrapolate either or both of the vectors so that the first vector and the second vector are of a same or similar dimensionality. Each dimension of the vectors can describe one or more attribute of a respective communication session.

The system 100 suggests the automated assistant to at least one user in the current communication session if the comparison exceeds a similarity threshold (606). The system can receive a similarity constraint and generate the comparison of the first vector and the second vector based on the similarity constraint. Exemplary similarity constraints can include a set of users, a set of automated assistants, timing, communication session content, and communication session metadata. If the comparison exceeds a higher similarity threshold, the system can also insert the automated assistant in the current communication session, optionally based on user preferences. If the automated assistant is inserted into the current communication session, the system can update the second vector based on interactions with the automated assistant in the current communication session.

FIG. 7 illustrates a second example method embodiment for predictively inserting an automated assistant in a communication session. The system 100 receives a first vector describing a current context of a current communication session (702) and generates a comparison of the first vector and a second vector associated with a past context of an automated assistant in a past communication session (704). Then, if the comparison exceeds a similarity threshold, the system 100 inserts the automated assistant into the current communication session as depicted in a graphical user interface for managing communication sessions, wherein the graphical user interface displays automated assistants in a same manner as human participants. This approach saves the "use context" for automated assistants and can predictively suggest automated assistants based on a temporal similarity vector between a current use context and stored use contexts associated with one or more automated assistants.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
generating, via a processor, a first vector describing a current communication session, the first vector comprising at least one of a first time, a first communication session participant, a first communication mode, a first telephone number, a first device, or a first location;
comparing the first vector with a second vector describing a past communication session associated with an automated assistant, to yield a comparison measurement that reflects how similar the current communication session is to the past communication session, wherein the second vector comprises at least one of a second time, a second communication session participant, a second communication mode, a second telephone number, a second device, or a second location; and
when the comparison measurement meets a similarity threshold condition, suggesting the automated assistant to a user in the current communication session.

2. The method of claim 1, wherein the first vector further describes a current context of the current communication session and the second vector further describes a past context of the past communication session, and wherein the first vector and the second vector are of different dimensionalities.

3. The method of claim 2, further comprising converting the first vector to a same dimensionality as the second vector in order to facilitate a comparison between the first vector and the second vector.

4. The method of claim 1, wherein each dimension of the first vector describes a single attribute of the current communication session.

5. The method of claim 1, wherein each dimension of the second vector describes a single attribute of the past communication session.

6. The method of claim 1, further comprising:
receiving a similarity constraint; and
comparing the first vector with the second vector based on the similarity constraint, to yield the comparison measurement.

7. The method of claim 6, wherein the similarity constraint comprises one from among a set of users, a set of automated assistants, timing, communication session content, and communication session metadata.

8. The method of claim 1, further comprising inserting the automated assistant in the current communication session.

9. The method of claim 8, further comprising updating the second vector based on interactions with the automated assistant in the current communication session.

10. A system comprising:
a processor and;
a computer-readable storage medium storing instructions which, when executed by the processor, cause the processor to perform operations comprising:
receiving a first vector describing a current communication session, the first vector comprising at least one of a first time, a first communication session participant, a first communication mode, a first telephone number, a first device, or a first location;
comparing the first vector with a second vector describing a past communication session associated with an automated assistant, to yield a comparison measurement that reflects how similar the current communication session is to the past communication session, wherein the second vector comprises at least one of a second time, a second communication session participant, a second communication mode, a second telephone number, a second device, or a second location; and when the comparison measurement meets a similarity threshold condition, inserting the automated assistant into the current communication session as depicted in a graphical user interface for managing communication sessions, wherein the graphical user interface displays the automated assistant in a same manner as human participants.

11. The system of claim 10, wherein the first vector further describes a current context of the current communication session and the second vector further describes a past context of the past communication session, and wherein the first vector and the second vector are of different dimensionalities.

12. The system of claim 11, wherein the computer-readable storage medium stores additional instructions which, when executed by the processor, cause the processor to perform a further operation comprising converting the first vector to a same dimensionality as the second vector in order to facilitate a comparison between the first vector and the second vector.

13. The system of claim 10, wherein each dimension of the first vector describes a single attribute of the current communication session.

14. The system of claim 10, wherein each dimension of the second vector describes a single attribute of the past communication session.

15. The system of claim 10, wherein the computer-readable storage medium stores additional instructions which, when executed by the processor, cause the processor to perform further operations comprising:

receiving a similarity constraint; and comparing the first vector with the second vector based on the similarity constraint, to yield the comparison measurement.

16. A computing device comprising:

a processor;

an input device; and a memory storing instructions which, when executed by the processor, cause the processor to perform operations comprising:

generating a first vector describing a current communication session, the first vector comprising at least one of a first time, a first communication session participant, a first communication mode, a first telephone number, a first device, or a first location;

comparing the first vector with a second vector describing a past communication session associated with an automated assistant, to yield a comparison measurement that reflects how similar the current communication session is to the past communication session, wherein the second vector comprises at least one of a second time, a second communication session participant, a second communication mode, a second telephone number, a second device, or a second location; and when the comparison measurement meets a similarity threshold condition, suggesting the automated assistant to a user in the current communication session.

17. The computing device of claim 16, wherein the memory stores additional instructions which, when executed by the processor, cause the processor to perform further operations comprising:

receiving a similarity constraint; and comparing the first vector with the second vector based on the similarity constraint, to yield the comparison measurement.

18. The computing device of claim 17, wherein the similarity constraint comprises one from among a set of users, a set of automated assistants, timing, communication session content, and communication session metadata.

19. The computing device of claim 16, wherein the memory stores additional instructions which, when executed by the processor, cause the processor to perform a further operation comprising inserting the automated assistant in the current communication session.

20. The computing device of claim 16, wherein the memory stores additional instructions which, when executed by the processor, cause the processor to perform a further operation comprising:

updating the second vector based on interactions with the automated assistant in the current communication session.

* * * * *

UNITED STATES PATENT AND TRADEMARK OFFICE
CERTIFICATE OF CORRECTION

PATENT NO. : 10,079,892 B2
APPLICATION NO. : 12/978926
DATED : September 18, 2018
INVENTOR(S) : Trung Dinh-Trong et al.

Page 1 of 1

It is certified that error appears in the above-identified patent and that said Letters Patent is hereby corrected as shown below:

In the Claims

At Column 12, Line 33, after "operation comprising" please insert --:-- therein.

Signed and Sealed this
Eighteenth Day of December, 2018

Andrei Iancu
*Director of the United States Patent and Trademark Office*